(12) United States Patent
Lin (10) Patent No.: US 7,280,595 B1
(45) Date of Patent: Oct. 9, 2007

(54) POST-INVERSE-QUANTIZATION AC PREDICTION WITH A UNIFIED VARIABLE-LENGTH-DECODING AND INVERSE-QUANTIZATION STAGE

(75) Inventor: Tao Lin, Shanghai (CN)

(73) Assignee: RedRock Semiconductor, Ltd., Sunnyvale, CA (US)

( * ) Notice: Subject to any disclaimer, the term of this patent is extended or adjusted under 35 U.S.C. 154(b) by 811 days.

(21) Appl. No.: 10/605,698

(22) Filed: Oct. 21, 2003

(51) Int. Cl.
*H04B 1/66* (2006.01)

(52) U.S. Cl. .................. 375/240.03; 375/240.25; 375/240.2; 375/240.23; 375/240.05; 375/240.07; 375/240.26; 382/233; 382/235; 382/250; 382/251; 382/239

(58) Field of Classification Search ......... 375/240.03, 375/240.25, 240.23, 240.2, 240.12, 240.05, 375/240.07, 340.26; 382/233, 235, 238, 382/250, 251, 239
See application file for complete search history.

(56) References Cited

U.S. PATENT DOCUMENTS

| | | | | |
|---|---|---|---|---|
| 5,001,559 | A * | 3/1991 | Gonzales et al. ......... 348/400.1 |
| 5,025,482 | A | 6/1991 | Murakami et al. .......... 382/239 |
| 5,875,266 | A | 2/1999 | Fukuda et al. .............. 382/251 |
| 5,903,679 | A | 5/1999 | Park ............................. 382/253 |
| 6,122,321 | A | 9/2000 | Sazzad et al. ......... 375/240.03 |
| 6,148,032 | A | 11/2000 | Pearlstein et al. ..... 375/240.15 |
| 6,173,080 | B1 | 1/2001 | Cho et al. ................... 382/250 |
| 6,333,949 | B1 | 12/2001 | Nakagawa et al. .... 375/240.16 |
| 6,341,144 | B1 | 1/2002 | Haskell et al. ........... 375/240.2 |
| 6,347,116 | B1 | 2/2002 | Haskell et al. ......... 375/240.03 |
| 6,418,165 | B1 | 7/2002 | Luna et al. .................. 375/240 |
| 6,434,273 | B1 | 8/2002 | Gillman et al. ............. 382/239 |
| 6,532,306 | B1 | 3/2003 | Boon et al. ................. 382/232 |
| 6,556,625 | B2 | 4/2003 | Haskell et al. ......... 375/240.03 |
| 6,950,473 | B2 * | 9/2005 | Kim et al. ............. 375/240.29 |
| 2002/0054709 | A1 | 5/2002 | Kajita et al. ................ 382/232 |
| 2003/0035587 | A1 | 2/2003 | Youn .......................... 382/238 |
| 2003/0138150 | A1 | 7/2003 | Srinivasan .................. 382/238 |

OTHER PUBLICATIONS

Fukunaga et al., "MPEG-4 Video Verification Model version 13.3", ISO/JEC JTCI/SC29/WGII, MPEG99/4960. Oct. 1999, section 3.4.6, pp. 1, 65-68.

* cited by examiner

Primary Examiner—Shawn S. An
(74) Attorney, Agent, or Firm—gPatent LLC; Stuart T. Auvinen (57) ABSTRACT

A motion-picture-experts group (MPEG) decoder performs AC prediction to decode first-column or first-row coefficients that are coded as differences from corresponding coefficients in a prior block or an above block. Rather than perform AC prediction between the variable-length decoder (VLD) and the inverse-quantizer (IQ), AC prediction is performed after the IQ. Post-IQ AC prediction allows the VLD and IQ to be constructed as a unified stage, improving decoding speed or efficiency as a single hardware stage can be used for the combined VLD/IQ. Rather than store priorblock quantized DCT coefficients, a coefficient store stores post-IQ DCT coefficients and quantization parameters. A Q-subtractor operates on the IQ output using the current quantization parameter, while another Q-subtractor operates on the stored coefficients and stored quantization parameter. The Q-subtractor subtracts a signed, odd-rounded quantization parameter from a coefficient.

16 Claims, 8 Drawing Sheets

PRIOR ART

FIG. 1

8X8 PIXEL BLOCK N

| P(N,0,0) | P(N,1,0) | P(N,2,0) |     | P(N,7,0) |
|----------|----------|----------|-----|----------|
| P(N,0,1) | P(N,1,1) | P(N,2,1) | ••• | P(N,7,1) |
| P(N,0,2) | P(N,1,2) | P(N,2,2) |     | P(N,7,2) |
| P(N,0,6) | P(N,1,6) | P(N,2,6) | ••• | P(N,7,6) |
| P(N,0,7) | P(N,1,7) | P(N,2,7) |     | P(N,7,7) |

FIG. 2A PRIOR ART

8X8 COEFFICIENT BLOCK N

| E(N,0,0) | E(N,1,0) | E(N,2,0) |     | E(N,7,0) |
|----------|----------|----------|-----|----------|
| E(N,0,1) | E(N,1,1) | E(N,2,1) | ••• | E(N,7,1) |
| E(N,0,2) | E(N,1,2) | E(N,2,2) |     | E(N,7,2) |
| E(N,0,6) | E(N,1,6) | E(N,2,6) | ••• | E(N,7,6) |
| E(N,0,7) | E(N,1,7) | E(N,2,7) |     | E(N,7,7) |

PRIOR ART

FIG. 3B

PRIOR ART

|  |  |  |  |  |
|---|---|---|---|---|
|  | BLK=0: | D(0,0,K) | D(0,J,0) | Q(0) |
| BLK N-L → | BLK=1: | D(1,0,K) | D(1,J,0) | Q(1) |
|  | • | • | • | • |
|  | • | • | • | • |
|  | • | • | • | • |
| BLK N-1 → | BLK=N-1: | D(N-1,0,K) | D(N-1,J,0) | Q(N-1) |
|  | BLK=N: | D(N,0,K) | D(N,J,0) | Q(N) |

POST-INVERSE-QUANTIZATION AC PREDICTION WITH A UNIFIED VARIABLE-LENGTH-DECODING AND INVERSE-QUANTIZATION STAGE

BACKGROUND OF INVENTION

This invention relates to video compression, and more particularly to decoder pipelines having coefficient prediction.

One fast-growing area of development is video transmission and compression. Video data can greatly enhance the quality of a computing experience. The consumer use of the Internet took off once graphics was linked to earlier text-based web pages. Portable consumer devices such as cell phones and personal digital assistant (PDA's) are being equipped with small cameras to allow for capture of still or even video pictures. Efficient transmission of captured images over limited-bandwidth links requires some sort of compression of the images.

A number of video-compression techniques are known. Compression standards, such as those developed by the motion-picture-experts group (MPEG), have been widely adopted. These compression techniques are lossy techniques, since some of the picture information is discarded to increase the compression ratio. However, compression ratios of 99% or more have been achieved with minimal noticeable picture degradation.

Next-generation compression standards have been developed for transmitting video over wireless networks. The MPEG-4 standard provides a robust compression technique for transmission over wireless networks. Recovery can occur when parts of the MPEG-4 bit stream is corrupted.

These MPEG standards ultimately break the image up into small 16×16 pixel macroblocks or even smaller 8×8 pixel blocks. Each block can then be compressed more or less independently of other blocks, and movement of blocks can be described as highly compressed "motion vectors" rather than large bitmaps of pixels.

Figure 1:
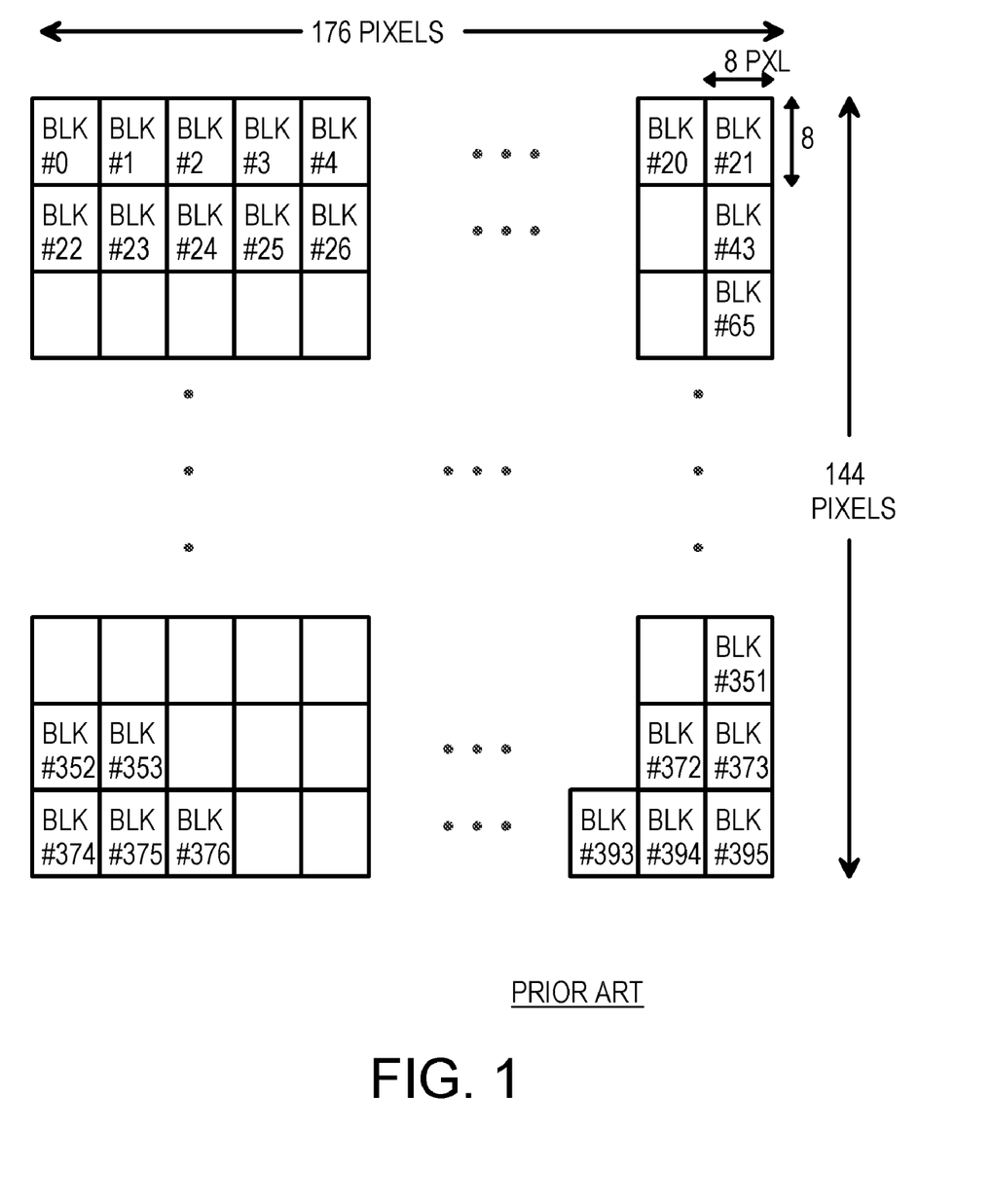
FIG. 1 shows an image frame divided into rows and columns of blocks.

FIG. 1 shows an image frame divided into rows and columns of blocks. The MPEG standard uses a divide-and-conquer technique in which the video sequence is divided into individual image frames known as video object planes (VOPs), and each frame is divided into rows and columns of macroblocks. Each macroblock is a rectangle of 16 by 16 pixels. Each macroblock can be further divided into 8×8 blocks.

Various window sizes and image resolutions can be supported by MPEG standards. For example, one common format is an image frame of 176 by 144 pixels. The image frame is divided into 18 rows of 8×8 blocks, with each row having 22 blocks each of 8×8 pixels. A total of 396 blocks are contained in each frame.

The blocks are arranged in a predetermined order, starting in the upper left with the first block (BLK #0). The second block, BLK #1, is to the right of BLK #0 in the first row, followed by blocks #2 to BLK #21 in the first row. The second row contains BLK #22 to BLK #43. The last row contains BLK #374 to BLK #395. Of course, other image sizes and formats can have the blocks in rows of various lengths, and various numbers of rows.

When an image frame is encoded, each block is encoded in macroblock-order, starting with the first macroblock of four blocks BLK #0,1 in the first row, and BLK #22, 2 3 in the second row, continuing to BLK #20, 21 in the first row and BLK# 42, 43 in the second row, and on until the last two rows to BLK #395. The blocks are arranged in the bit stream into one or more video packets (VP) with a header. In this example Y values of pixels are shown.

Figure 2A:
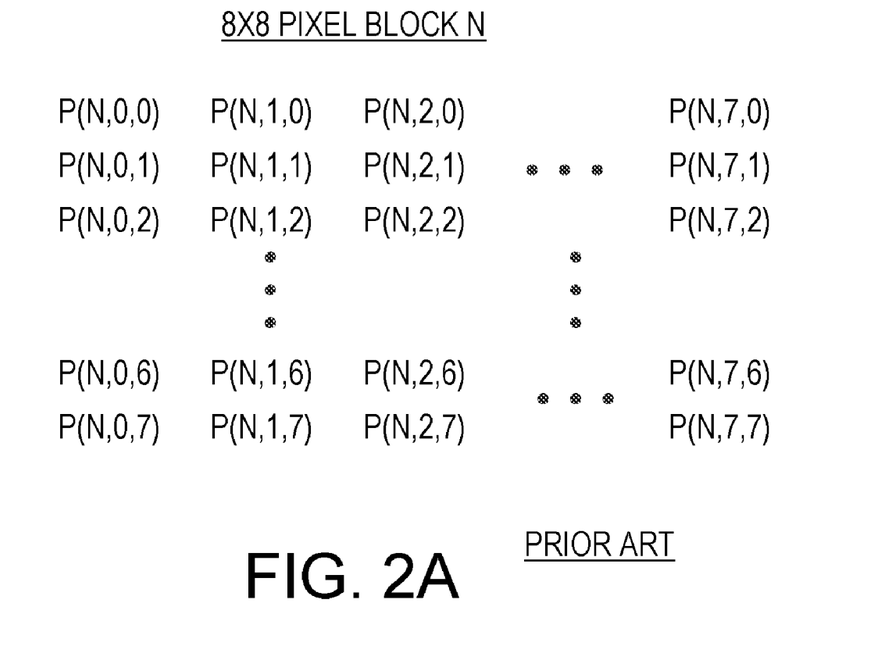
FIG. 2A shows an 8×8 block of pixels.

FIG. 2A shows an 8×8 block of pixels. Pixels can have components, such as luminance Y values and U, V chrominance values. An 8×8 pixel block may have 64 Y values but only half or one-quarter as many U or V values. FIG. 2A shows an 8×8 array of pixel values for block N. Each pixel is identified by its block number, column, and row. Thus pixel P(55,2,6) is the pixel at the second column of the sixth row of block 55. The 8×8 blocks can be Y values or U or V values, but only half as many rows and columns exist for U and V values for some common YUV formats.

Figure 2B:
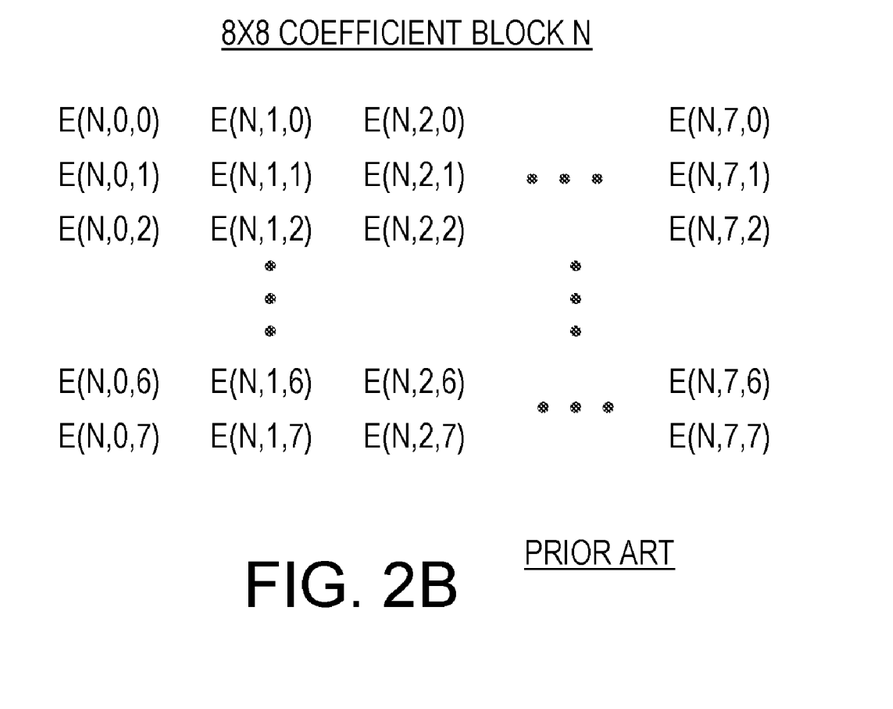
FIG. 2B shows an 8×8 block of quantized DCT coefficients.

FIG. 2B shows an 8×8 block of quantized DCT coefficients. After motion compensation blocks are compressed. During compression, the block of 8×8 pixel values shown in FIG. 2A is transformed from the spatial into the frequency domain using a transform such as a discrete cosine transform (DCT). The result of the DCT is an 8×8 array of coefficients. The DCT coefficients are designated D(b,c,r), where b is the block #, c is the column #, and r is the row #.

The DCT coefficients D(b,c,r) are then scaled or quantized by a quantization parameter Q. For example, when Q is 6, DCT coefficient values between 0 and 5 can be scaled to 0, while values between 6 and 11 are scaled to 6. These scaled values can be level-shifted by half the scale: 0 is shifted to 3, while 6 is shifted to 9. Since 12 input values (0-11) are reduced to 2 output value (3,9), compression occurs during quantization. Quantization changes the DCT coefficients D(b,c,r) into quantized DCT coefficients E(b,c,r). The quantized DCT coefficients E(b,c,r) are sometimes referred to as AC coefficients, except for the first coefficient E(b,0,0), which is known as the DC coefficient.

Although there are the same number and arrangement of quantized coefficients as pixels, there is not a one-to-one correspondence of coefficient values to pixel values. Pixel P(12,4,3) does not directly correspond to coefficient E(12,4, 3), even though they have the same position in block 12's array. A pixel cannot be generated from only the coefficient at the same position. Instead, many coefficients are needed to re-generate a pixel value using an inverse DCT.

In general, coefficients in one block do not have much correlation to coefficients in other blocks. However, the first row and column of coefficients does show some correlation to other blocks. The very first (DC) coefficient E(N,0,0) is unique to each block. However, other "alternating-current" (AC) coefficients in the first row and first column show correlation to coefficients in other blocks. These first-row and first-column coefficients are known as A.C. coefficients, and can be predicted using a technique known as adaptive AC coefficient prediction. D.C. coefficients can be predicted by another mechanism.

Figure 3A:
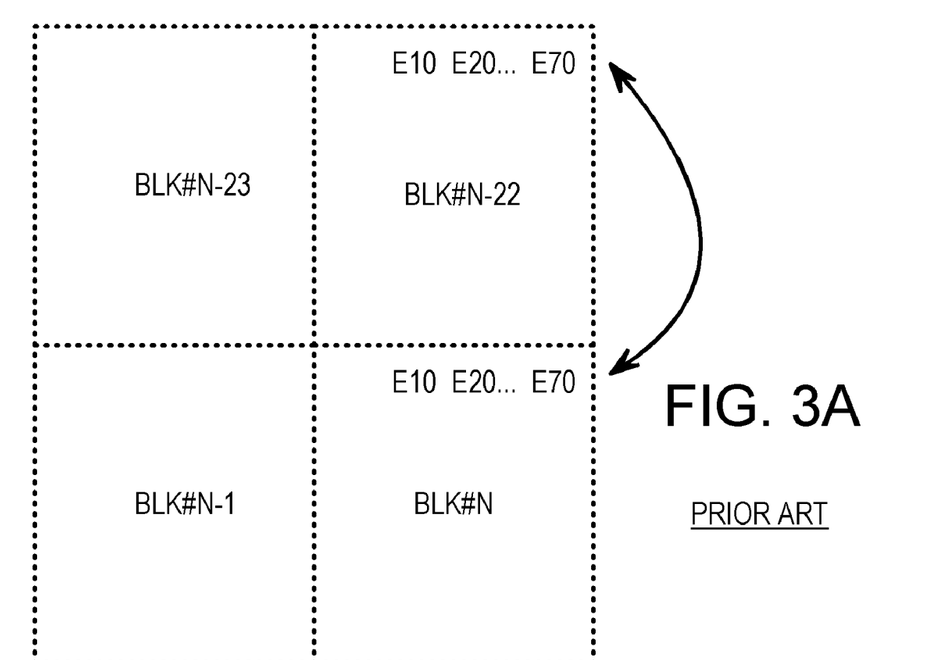
FIG. 3A shows correlation of first-row AC coefficients with the first row of the block above.

FIG. 3A shows correlation of first-row AC coefficients with the first row of the block above. A current block N has a first row of DCT coefficients E(N,0,0), E(N,1,0), E(N,2,0), E(N,3,0) . . . E(N,7,0). The first coefficient is E(N,0,0). The remaining coefficients E(N,1,0), E(N,2,0), E(N,3,0) . . . E(N,7,0) in block N often show a correlation to the first-row coefficients in the block above, block N-L, where L is the number of rows (22 in this example). Thus the first-row AC coefficients E(N,1,0), E(N,2,0), E(N,3,0) . . . E(N,7,0) in block N often show some correlation to the first-row AC coefficients E(N-22,1,0), E(N-22,2,0), E(N-22,3,0) . . . E(N-22,7,0) in the above block N-22.

The first-row AC coefficients E(N, 1,0), E(N,2,0), E(N,3, 0) . . . E(N,7,0) in block N can be differentially coded as differences from the first-row AC coefficients E(N-22,1,0), E(N-22,2,0), E(N-22,3,0) . . . E(N-22,7,0) in block N-L, improving compression since the difference values require fewer bits than do full coefficient values. During de-compression, block N's first row coefficients E(N,1,0), E(N,2,0), E(N,3,0) . . . E(N,7,0) can be generated from E(N-22,1,0), E(N-22,2,0), E(N-22,3,0) . . . E(N-22,7,0).

Figure 3B:
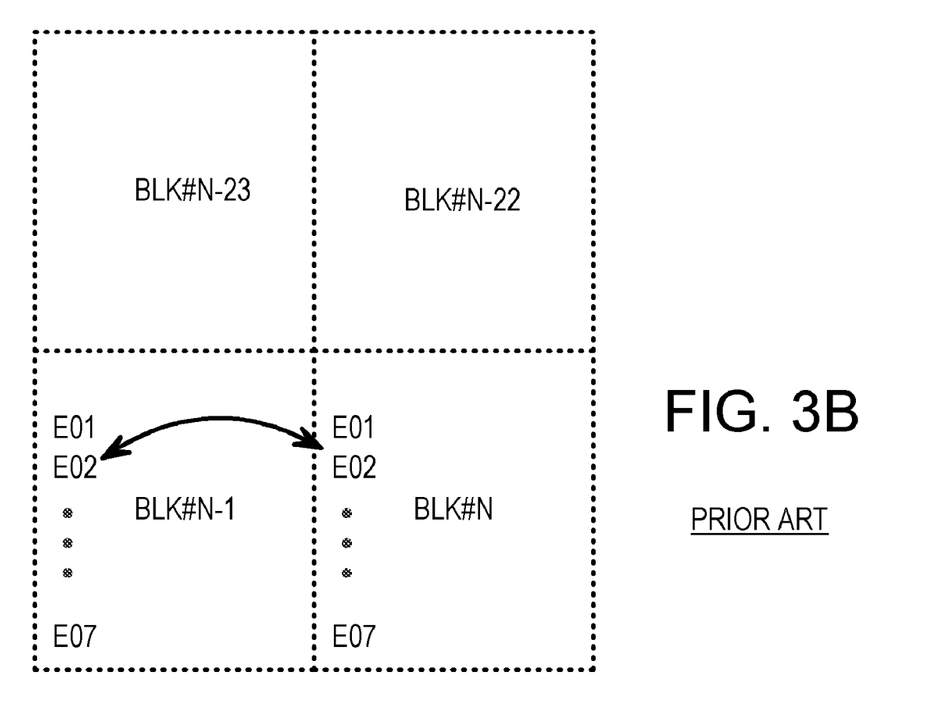
FIG. 3B shows correlation of first-column AC coefficients with the first column of the previous block to the left.

FIG. 3B shows correlation of first-column AC coefficients with the first column of the previous block to the left. A current block N has a first column of DCT coefficients E(N,0,0), E(N,0,1), E(N,0,2), E(N,0,3) . . . E(N,0,7). The first coefficient E(N,0,0) is predicted using another mechanism, but the remaining coefficients E(N,0,1), E(N,0,2), E(N,0,3) . . . E(N,0,7) in block N often show a correlation to the first-column coefficients in the prior above, block N1. Thus the first-column AC coefficients E(N,0,1), E(N,0,2), E(N,0,3) . . . E(N,0,7) in block N often show some correlation to the first-column AC coefficients E(N-1,0,1), E(N-1,0,2), E(N-1,0,3) . . . E(N-1,0,7) in the prior block N-1. The first-column coefficients for block N can be coded as differences with the first-column coefficients in block N-1 and later re-generated during de-compression using AC prediction.

Figure 4:
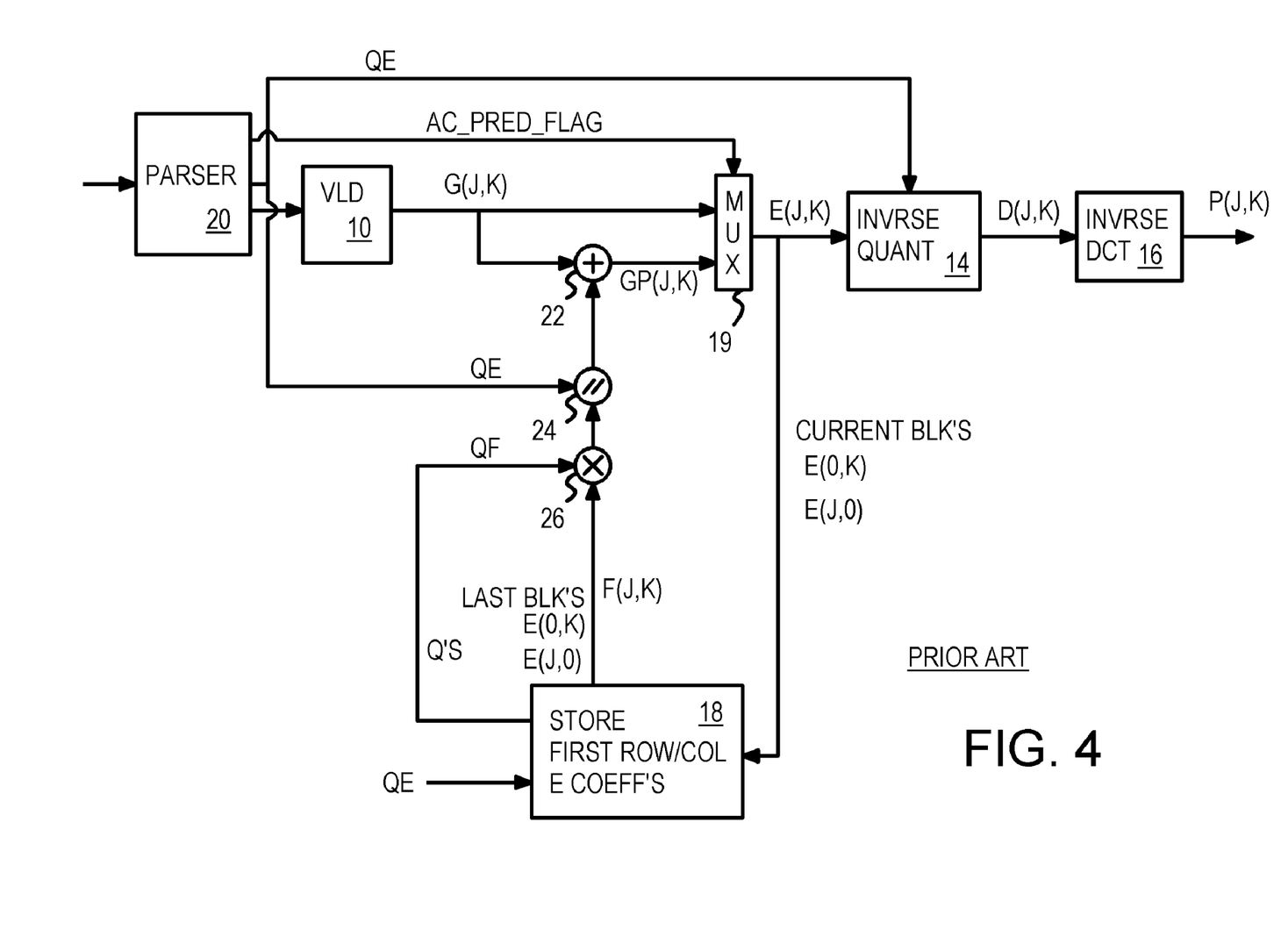
FIG. 4 is a block diagram of a prior-art decoder that performs AC prediction between the variable-length decoder and the inverse-quantizer.

FIG. 4 is a block diagram of a prior-art decoder that performs AC prediction between the variable-length decoder and the inverse-quantizer. Parser 20 receives an MPEG-compressed bit-stream and extracts an AC prediction flag for the current block. When the AC prediction flag is false, no AC prediction is performed. Instead, mux 19 selects the decoded G(j,k) output from variable-length decoder 10. Variable-length decoder 10 receives the 8×8 block's coefficients from parser 20 and decodes the block's portion of the bit-stream using a variable-length decoding. For example, common coefficient values can be coded with a few bits while uncommon coefficient values can be coded as longer bit codes.

The decoded G(j,k) coefficients selected by mux 19 are the quantized DCT coefficients E(j,k), where j is the column and k is the row for the coefficient in the current block N. Inverse-quantizer 14 performs the inverse of the scaling and quantization step performed by the encoder, using the quantization parameter Qe that parser 20 extracts from the bit-stream. The quantization parameter Qe can be different for different blocks, or can be the same for all blocks in a frame. Inverse-quantizer 14 generates the reconstructed DCT coefficients D(j,k). Inverse DCT 16 performs an inverse DCT operation on the on all coefficients in the 8×8 block at one time. D(j,k) coefficients to generate the reconstructed pixel values P(j,k) for the block. The pixel values can be stored or displayed.

When the AC prediction flag is true, AC prediction is performed. Mux 19 selects the predicted quantized DCT coefficients G(j,k) from the lower input rather than the bit-stream quantized DCT coefficients G(j,k) from variable-length decoder 10. Adder 22 generates the predicted quantized DCT coefficients G(j,k) by adding an adjusted stored coefficient to the bit-stream quantized DCT coefficients G(j,k), which contain a differential value.

Quantized DCT coefficients from prior blocks are stored by coefficient store 18. The quantized DCT coefficients E(j,k) for the first row and for the first column of each current block are copied to coefficient store 18. Later, these stored coefficients can be read from coefficient store 18 as the prior block (N-1) or above block's (N-L) stored coefficients. The prior blocks' quantization parameters Qf are also stored.

The stored coefficients from coefficient store 18 must be adjusted since the quantization parameters for the current and prior blocks may be different. The stored coefficients for the prior block (either block above N-L or block to the left N-1) is read from coefficient store 18 and multiplied by the stored quantization parameter Qf for the prior block by multiplier 26. The result of multiplier 26 is then divided by the current block's quantization parameter Qe using divider 24. Divider 24 can be an integer divider that rounds to the nearest integer. Half-integer values are rounded away from zero.

Multiplier 26 and divider 24 thus correct the stored coefficient from coefficient store 18 for the differing quantization parameters. Multiplier 26 and divider 24 adjust the stored coefficients by a ratio of Qf to Qe. The adjusted stored coefficient is then added by adder 22 to the bit-stream quantized DCT coefficients G(j,k), generating the predicted quantized DCT coefficients G(j,k). Mux 19 selects the predicted quantized DCT coefficients for the first row or first column and sends these to inverse-quantizer 14.

The overall effect of AC prediction is to generate the reconstructed quantized DCT coefficients for the first row or column:

$$E = G + (F*Qf)//Qe,$$

where F is the stored coefficient from coefficient store 18 and // represents integer division with integer rounding away from zero. Other rows and columns are passed through the upper input of mux 19:

$$E = G$$

While such an AC predictor is useful, such AC prediction is performed between variable-length decoder 10 and inverse-quantizer 14. This precludes a simple unified variable-length decoder and inverse-quantizer. What is desired is a unified variable-length decoder and inverse-quantizer stage. A unified variable-length decoder and inverse-quantizer is desired that still allows for AC prediction.

DETAILED DESCRIPTION

The present invention relates to an improvement in video de-compression. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

MPEG bit-streams may be coded and compressed by a variety of coders and typically follow the MPEG specification. AC prediction is expected to be performed on the quantized DCT coefficients before inverse-quantization.

The inventor has realized that a unified, single-stage variable-length decoder and inverse-quantizer is desirable. A dedicated, unified variable-length decoder and inverse-quantizer could allow both to be performed in a single step or clock cycle, improving decoder performance. Since AC prediction is performed only on the first row or column, it can be performed later, after the inverse-quantizer. The inverse-quantizer performs the operation:

$$D=IQ(E,Qe)=2*E*Qe+\text{sign}(E)*\text{odd}(Qe)$$

where sign(E) is −1, 0, +1 when E is negative, zero, or positive, and odd(Qe) is Qe for odd numbers, Qe−1 for even numbers.

The inventor realizes that AC prediction can be moved to occur after the inverse-quantizer, allowing the inverse-quantizer to be combined with the variable-length decoder. The inventor performs AC prediction on the reconstructed DCT coefficients D(j,k) output by the inverse-quantizer, rather than the quantized DCT coefficients E(j,k) output by the variable-length decoder.

Figure 5:
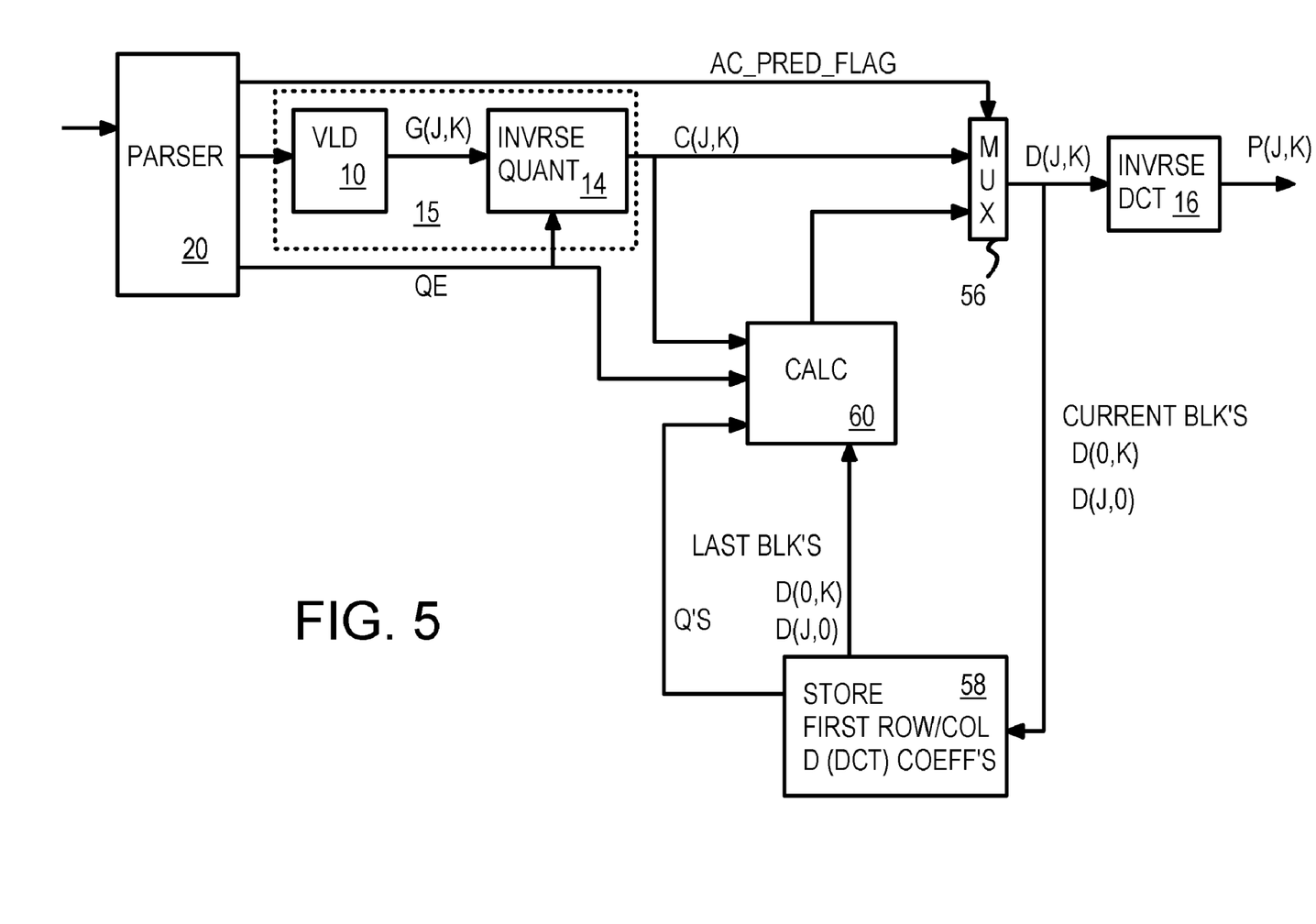
FIG. 5 is an overview of AC prediction after a unified variable-length decoder and inverse-quantizer stage.

FIG. 5 is an overview of AC prediction after a unified variable-length decoder and inverse-quantizer stage. Unified VLD/IQ stage 15 includes the functions of variable-length decoder 10 and inverse-quantizer 14 in a single stage. Unified VLD/IQ stage 15 receives a coded 8×8 block from parser 20 and generates DCT coefficients C(j,k). Intermediate quantized DCT coefficients G(j,k) may not be directly generated by unified VLD/IQ stage 15.

When parser 20 reads the AC prediction flag for the current block as false, mux 56 outputs C(j,k) from unified VLD/IQ stage 15 as DCT coefficients D(j,k). Inverse DCT 16 then generates pixels P(j,k) for the block from DCT coefficients D(j,k).

When the AC prediction flag is true, mux 56 selects predicted DCT coefficients from calculator 60 for the first row or column. Calculator 60 receives the current block's quantization parameter Qe from parser 20. Qe is also sent to inverse-quantizer 14. Calculator 60 also reads the prior block's quantization parameter Qf and the prior block's DCT coefficients D(j,k) that were earlier stored by coefficient store 58 for the previous block N-1 or the block above N-L.

Calculator 60 performs a more complex calculation than for AC prediction of FIG. 4. However, calculator 60 is only needed for one row or one column of a block, and only when the block has its AC prediction flag set. The performance improvement of unified VLD/IQ stage 15, which improves performance for all coefficients in all blocks, more than makes up for the complexity of calculator 60.

Rather than store the quantized DCT coefficients E(j,k), coefficient store 58 stores the DCT coefficients D(j,k) after inverse-quantization.

Figure 6:
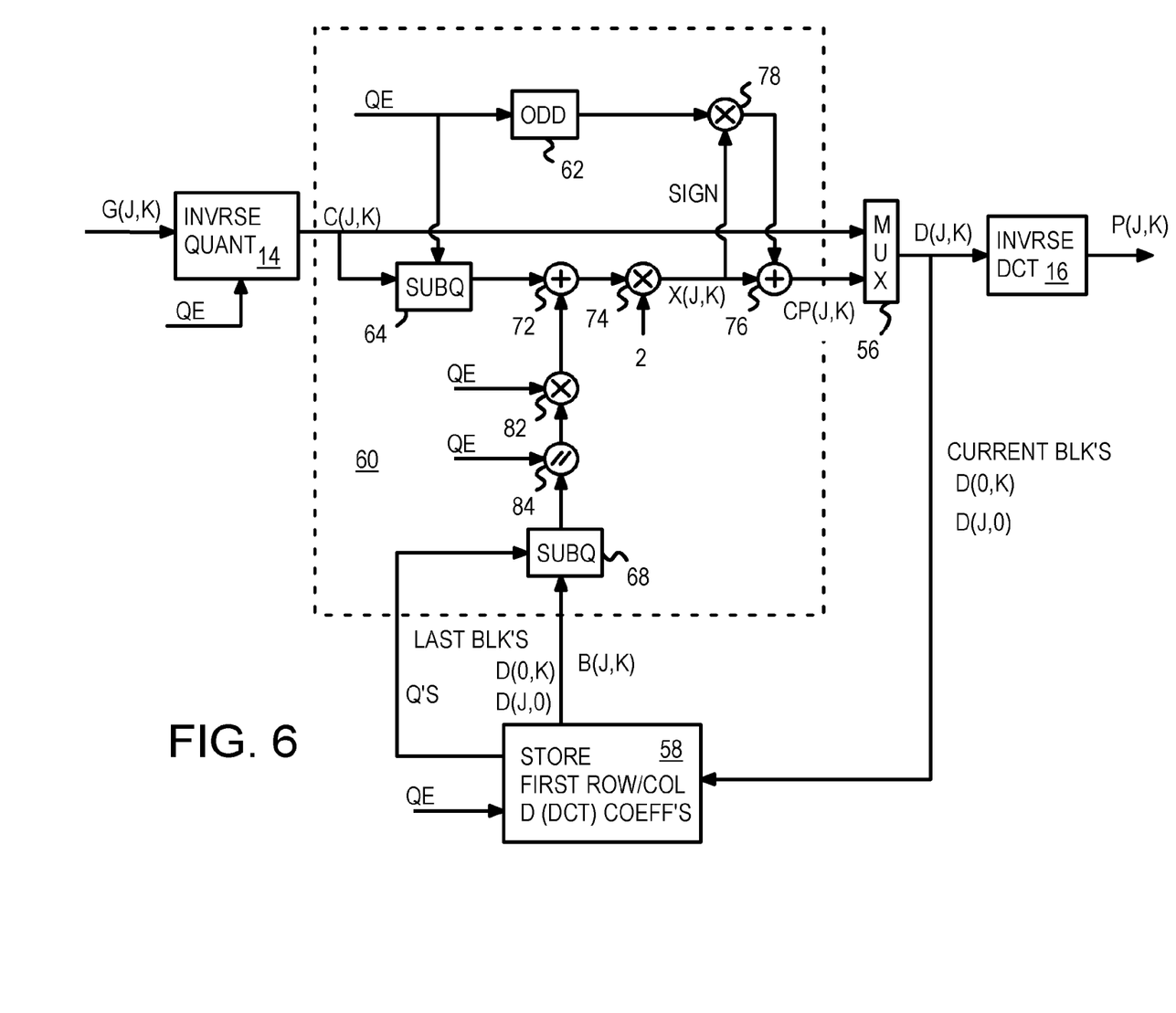
FIG. 6 shows in more detail an AC predictor that operates after inverse-quantization.

FIG. 6 shows in more detail an AC predictor that operates after inverse-quantization. Inverse-quantizer 14 of unified VLD/IQ stage 15 outputs reconstructed DCT coefficients C(j,k) after scaling G(j,k) by the current quantization parameter Qe. Mux 56 selects C(j,k) when the AC prediction flag is not set, or for non-first rows and columns. These coefficients C(j,k) become the DCT coefficients D(j,k) applied to inverse DCT 16 to generate the block's pixels P(j,k).

The reconstructed DCT coefficients D(j,k) and quantization parameter Qe are stored in coefficient store 58 for the first row and first column of each block. Later, these stored coefficients can be used for AC coefficient prediction by calculator 60.

The inventor defines a subtract-Q "SubQ" function as:

$$\text{Sub}Q(x,Q)=(x-\text{sign}(x)*\text{odd}(Q))/2,$$

where sign(x) is −1, 0, +1 when x is negative, zero, or positive, respectively. Odd(Q) is Q when Q is odd, or Q−1 when Q is even.

When x is positive and Q is odd, SubQ is half of the difference between x and Q, and is positive when x is larger than Q. When x is negative and Q is odd, SubQ is still half of the difference between x and Q, but is negative when |x| is larger than Q. The quantization parameter Q is always positive, but x, which is a coefficient, may be negative or positive. When Q is even, it is rounded down to the next odd integer, so SubQ is not exactly half the difference for even Q.

Q-subtractor 68 receives the stored coefficients B(j,k) from coefficient store 58 as the x input, and the stored quantization parameter Qf as the Q input, and outputs the SubQ function result to divider 84. The SubQ result for the stored coefficient is divided by the current quantization parameter Qe by divider 84 and then multiplied by the current quantization parameter Qe with multiplier 82. Since divider 84 is an integer divider that rounds to the nearest integer, the combination of multiplying and dividing by the same number (Qe) is not necessarily 1. Thus multiplier 82 and divider 84 correct stored coefficients for integer-division rounding.

Q-subtractor 64 performs the SubQ function on the current-block DCT coefficients C(j,k), using the current block's quantization parameter Qe. The SubQ result is added to the corrected stored coefficient from multiplier 82 by adder 72.

The sum from adder 72 is doubled by multiplier 74 to generate coefficient value X. A final adjustment is made to X to generate the predicted DCT coefficients CP(j,k) input to mux 56. The current quantization parameter Qe is rounded down to the nearest odd integer by odd generator 62. Then the sign of X is applied to the odd Qe by multiplier 78, which does not have to be a full multiplier. The signed, odd Qe is then added to coefficient X by final adder 76 to generate predicted DCT coefficients CP(j,k) input to mux 56, than become the reconstructed DCT coefficients D(j,k) when AC prediction is performed.

Figure 7:
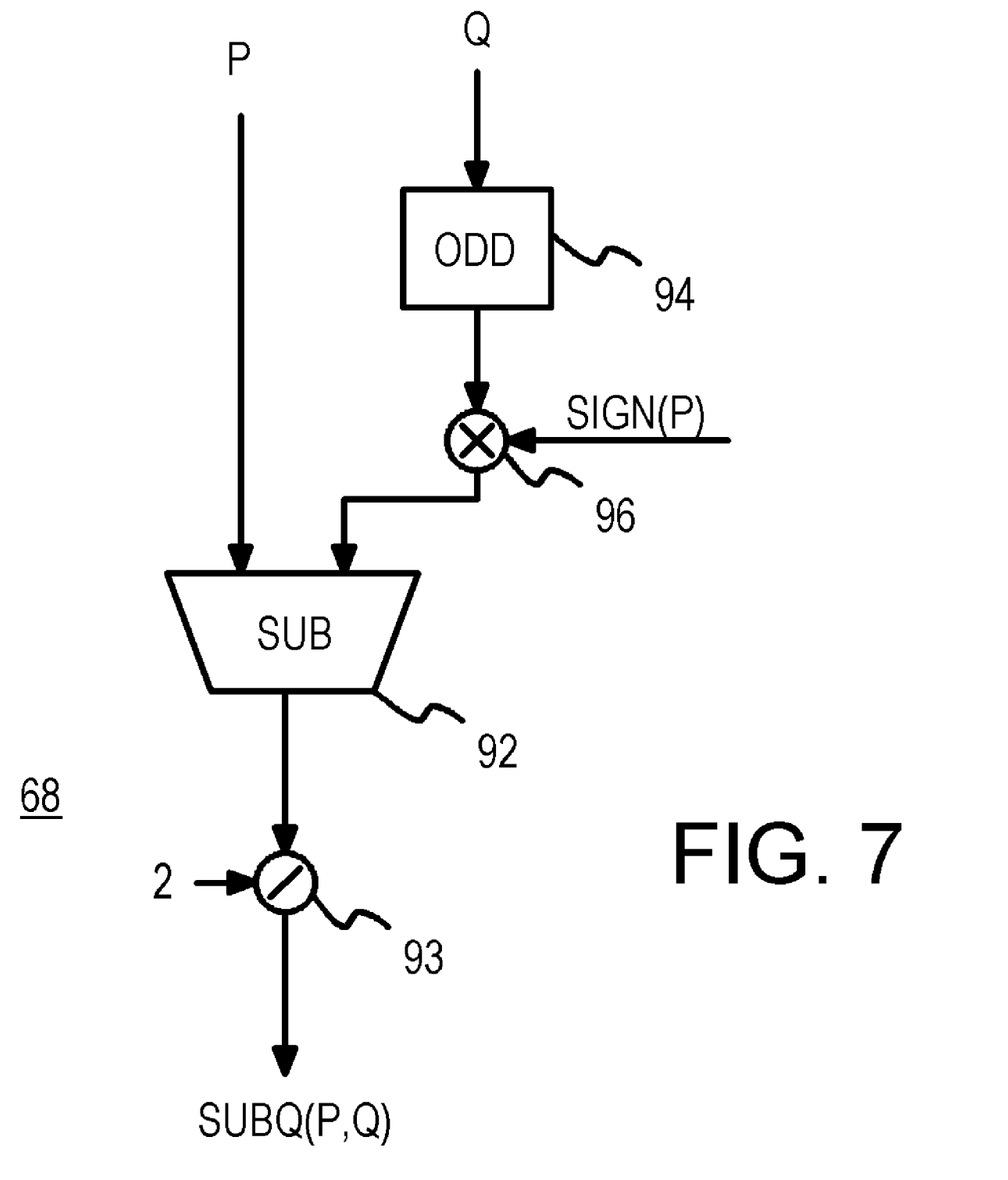
FIG. 7 shows a Q-subtractor block.

FIG. 7 shows a Q-subtractor block. Odd rounder 94 rounds down to the nearest odd integer of input Q. The sign of input P is multiplied by sign multiplier 96 with the output of odd rounder 94 and the result is input to subtractor 92. Subtractor 92 subtracts the result of sign multiplier 96 from input P. Divider 93 divides the output of subtractor 92 by 2 to generate the SubQ(P,Q) result of Q-subtractor 68. The SubQ function is defined as SubQ(P,Q)=(P−sign(P)*odd(Q))/2.

Figure 8:
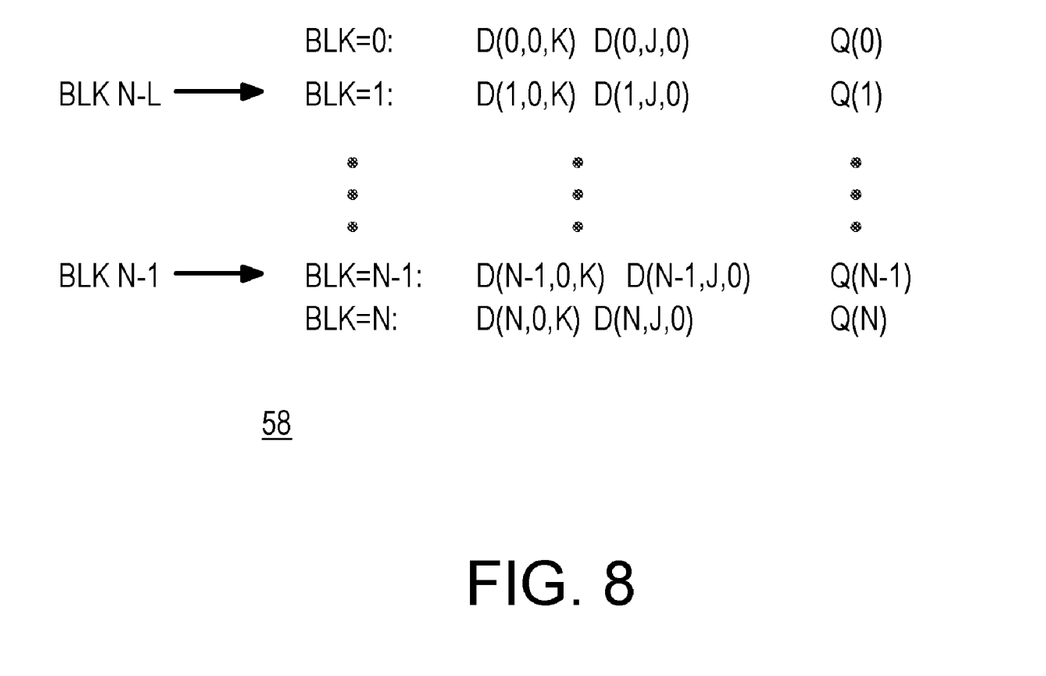
FIG. 8 shows coefficients and quantization parameters stored in the coefficient store.

FIG. 8 shows coefficients and quantization parameters stored in the coefficient store. For each block N, the reconstructed DCT coefficients for the first row D(N,j,0) and first column D(N,0,k) are stored in coefficient store 58. The quantization parameter Qe for that block is also stored as Q(N). As new blocks are processed, the current-block pointer N is advanced.

When AC prediction is performed to the prior block, the first column coefficients D(N-1,0,k) for the prior block are read from coefficient store 58 as the stored coefficients. The stored Q(N-1) is also read as the stored quantization parameter Qf. When AC prediction is performed to the block above, the first row coefficients D(N-L,j,0) for the above block N-L, where L is the number of blocks in a row, are read from coefficient store 58 as the stored coefficients. The stored Q(N-L) is also read as the stored quantization parameter Qf.

Equations for Functions Performed

The functions performed by the blocks of calculator 60 in FIG. 6 can be derived as follows:

The quantization parameter Q is always a positive number. B(j,k) represents the stored coefficients D(j,k) for the prior block N-1 or N-L, either for the first row or first column. Qf is the stored quantization parameter for block N-1 of N-L.

The subtract-Q or "SubQ" function is defined as:

$$SubQ(x,Q)=(x-\text{sign}(x)*\text{odd}(Q))/2,$$

where sign(x) is −1, 0, +1 when x is negative, zero, or positive, respectively.

The odd function Odd(Q) is Q when Q is odd, or Q−1 when Q is even.

AC Prediction can be defined as:

$$E=G+(F*Qf)//Qe \qquad \text{(Eqn. 1)}$$

Inverse-quantization can be defined as:

$$D=IQ(E,Qe)=2*E*Qe+\text{sign}(E)*\text{odd}(Qe) \qquad \text{(Eqn. 2)}$$

If the inverse-quantization is performed on the VLD output G rather than E to generate C:

$$C=IQ(G,Qe)=2*G*Qe+\text{sign}(G)*\text{odd}(Qe)$$

Re-arranging:

$$2*G*Qe=C-\text{sign}(G)*\text{odd}(Qe)$$

Since the sign(C)=sign(G):

$$2*G*Qe=C-\text{sign}(C)*\text{odd}(Qe)$$

Substituting the SubQ function:

$$G*Qe=(C-\text{sign}(C)*\text{odd}(Qe))/2=SubQ(C,Qe) \qquad \text{(Eqn. 3)}$$

The prior-art stored quantized DCT coefficients E as the predictor F. In the invention, DCT coefficients D after the inverse-quantizer are stored as the predictor B. The new B is the inverse-quantization of the old F:

$$B=IQ(F,Qf)=2*F*Qf+\text{sign}(F)*\text{odd}(Qf)$$

Re-arranging:

$$2*F*Qf=B-\text{sign}(F)*\text{odd}(Qf)$$

Since the sign(B)=sign(F):

$$F*Qf=(B-\text{sign}(B)*\text{odd}(Qf))/2$$

Substituting the SubQ function:

$$F*Qf=(B-\text{sign}(B)*\text{odd}(Qf))/2=SubQ(B,Qf) \qquad \text{(Eqn. 4)}$$

AC Prediction can be defined as:

$$E=G+(F*Qf)//Qe \qquad \text{(Eqn. 1)}$$

Inverse-quantization can be defined as:

$$D=IQ(E,Qe)=2*E*Qe+\text{sign}(E)*\text{odd}(Qe) \qquad \text{(Eqn. 2)}$$

Substituting for E using Eqn. 1:

$$D=IQ(E,Qe)=2*G*Qe+2*((F*Qf)//Qe)*Qe+\text{sign}(E)*\text{odd}(Qe)$$

Substituting with Eqn. 3, where G*Qe=SubQ(C,Qe):

$$D=2*SubQ(C,Qe)+2*((F*Qf)//Qe)*Qe+\text{sign}(E)*\text{odd}(Qe)$$

Further substituting with Eqn. 4, where F*Qf=SubQ(B, Qf):

$$D=2*SubQ(C,Qe)+2*(SubQ(B,Qf)//Qe)*Qe+\text{sign}(E)*\text{odd}(Qe)$$

Define X as 2*SubQ(C,Qe)+2*(SubQ(B,Qf)//Qe)*Qe and substitute:

$$D=X+\text{sign}(E)*\text{odd}(Qe)$$

Since sign(D)=sign(E)=sign(X):

$$D=X+\text{sign}(X)*\text{odd}(Qe).$$

X is the output of multiplier 74, which is the value of node X between 74 and 76 in FIG. 6.

Of course, when no AC prediction is done, $$D=C$$

ALTERNATE EMBODIMENTS

Several other embodiments are contemplated by the inventor. A more complex AC prediction flag may be used to select whether the first row or the first column is predicted. Numbers such as the quantization parameters could be shifted, inverted, etc.

The functional and computational blocks can be implemented in a variety of ways, such as by firmware routines in a digital-signal processor (DSP) chip, or in logic in a logic array chip, or as software routines executed by a processor, or a combination of techniques. The blocks can be partitioned in many different ways. A programmable register can allow calculations to be disabled, or allow for different threshold values or equations to be used. Additional dividers, multipliers, inverters, etc. could be added to achieve the same or similar results. Active-low rather than active-high signals may be used, and various encodings can be substituted.

Other video formats, frame sizes, and block sizes could be supported. Many other functional blocks can exist in a complex MPEG decoder, and pipelining logic and staging registers may also be present. Various pipelining registers can be added. Different versions of the MPEG or other compression standards could be supported.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A motion-picture-experts group (MPEG) decoder comprising:
   a unified VLD/IQ stage having a variable-length decoder (VLD) and a inverse-quantizer (IQ), that outputs from the inverse-quantizer non-predicted discrete cosine transform (DCT) coefficients, the non-predicted DCT coefficients not adjusted for AC prediction of coefficients, the unified VLD/IQ stage not performing AC prediction of coefficients;
   an inverse DCT transformer, receiving DCT coefficients, for performing an inverse discrete cosine transform on the DCT coefficients to generate pixels for a current block;
   a mux supplying the DCT coefficients to the inverse DCT transformer, the mux selecting the non-predicted DCT coefficients from the unified VLD/IQ stage when AC prediction is not performed, but selecting predicted DCT coefficients for a first row or a first column in the current block when AC prediction is preformed;
   a coefficient store, coupled to receive the DCT coefficients from the mux, for storing DCT coefficients for prior blocks as stored DCT coefficients; and
   a post-IQ calculator, receiving the stored DCT coefficients from the coefficient store, and receiving the non-predicted DCT coefficients from the inverse-quantizer in the unified VLD/IQ stage, for generating the predicted DCT coefficients to the mux by performing post-inverse-quantizer AC prediction;
   wherein the unified VLD/IQ stage sends quantized DCT coefficients from the variable-length decoder directly to the inverse-quantizer without outputting the quantized DCT coefficients;
   wherein the stored DCT coefficients in the coefficient store are non-quantized DCT coefficients;
   wherein the current block is block N, wherein N is a positive integer;
   wherein a prior block is an above block N-L when DCT coefficients for the first row of the current block are AC predicted, wherein L is a number of blocks in a image-row of a video frame;
   wherein the prior block is an immediately prior block N-1 when DCT coefficients for the first column of the current block are AC predicted;
   wherein the post-IQ calculator comprises:
   a current Q-subtractor that receives the current quantization parameter sent to the inverse-quantizer for the current block and receives the non-predicted DCT coefficients from the inverse-quantizer, for generating current corrected coefficients;
   a prior Q-subtractor that receives the stored quantization parameter and the stored DCT coefficients from the coefficient store for a prior block, for generating first prior corrected coefficients;
   a divider/multiplier, receiving the first prior corrected coefficients from the prior Q-subtractor, for dividing and multiplying by the current quantization parameter to generate adjusted prior coefficients;
   an adder, coupled to the current Q-subtractor, for adding the current corrected coefficients with the adjusted prior coefficients to generate combined coefficients; and
   a final combiner, coupled to the adder, for combining the current quantization parameter with the combined coefficients to generate the predicted DCT coefficients to the mux;
   whereby the quantized DCT coefficients are not used for AC prediction but the non-quantized DCT coefficients to the inverse DCT transformer are used for AC prediction and whereby prior blocks for AC prediction are above blocks and immediately prior blocks, and
   whereby AC prediction is performed on DCT coefficients input to the inverse DCT transformer after the inverse-quantizer.

2. The MPEG decoder of claim 1 wherein the divider/multiplier comprises:
   an integer divider, receiving the first prior corrected coefficients from the prior Q-subtractor, for dividing by the current quantization parameter to generate second prior corrected coefficients;
   a multiplier, receiving the second prior corrected coefficients from the integer divider, for multiplying by the current quantization parameter to generate the adjusted prior coefficients.

3. The MPEG decoder of claim 2 wherein the final combiner comprises:
   an odd generator, receiving the current quantization parameter, for rounding the current quantization parameter to an odd value to generate an odd quantization parameter; and
   a final adder that adds the odd quantization parameter to double the combined coefficients when the combined coefficient is positive, but subtracts the odd quantization parameter from the combined coefficients when the combined coefficient is negative, to generate the predicted DCT coefficients.

4. The MPEG decoder of claim 3 wherein the current and prior Q-subtractor each comprise:
   an odd generator, receiving a quantization parameter, for rounding the quantization parameter to an odd value to generate an odd quantization parameter;
   a subtractor that subtracts the odd quantization parameter from a coefficient when the coefficient is positive, but adds the odd quantization parameter to the coefficient when the coefficient is negative; and
   a divider that divides an output of the subtractor by two.

5. The MPEG decoder of claim 4 wherein the coefficient store also receives the current quantization parameter, the coefficient store storing quantization parameters for prior blocks and outputting the stored quantization parameter.

6. The MPEG decoder of claim 5 further comprising:
   a parser receiving a MPEG-encoded bit-stream, for parsing the MEPG-encoded bit-stream for segments to send to the variable-length decoder for decoding into the quantized DCT coefficients for a current block;
   wherein the parser extracts an AC prediction flag for the current block from the bit-stream;
   wherein the mux selects as the DCT coefficients to the inverse DCT transformer the predicted DCT coefficients for a first row or a first column in the current block when the AC prediction flag indicates that AC prediction is to is preformed;

the mux selecting the non-predicted DCT coefficients from the unified VLD/IQ stage when the AC prediction flag indicates that AC prediction is not performed.

7. The MPEG decoder of claim 1 wherein the current block contains 64 pixels in 8 rows and 8 columns represented by 64 DCT coefficients.

8. The MPEG decoder of claim 2 wherein a coefficient in the first row and in the first column is not AC predicted.

9. A computer-readable medium storing a computer program for decoding compressed video comprising:
parsing an encoded bit-stream for an AC prediction flag for a current block;
sending a current portion of the encoded bit-stream for the current block to a unified stage;
in the unified stage, decoding the current portion of the encoded bit-stream with a variable-length decoder to generate quantized discrete cosine transform (DCT) coefficients;
in the unified stage, performing inverse-quantization on the quantized DCT coefficients using a current quantization parameter for the current block to generate unified-stage output coefficients;
selecting as selected coefficients the unified-stage output coefficients for input to an inverse transformer when the AC prediction flag is false;
generating pixels for the current block from the selected coefficients by performing an inverse discrete cosine transform;
storing the selected coefficients for a first row and for a first column as stored coefficients;
storing the current quantization parameter as a stored quantization parameter;
generating predicted coefficients for the first row or for the first column when the AC prediction flag is true by combining the unified-stage output coefficients, the current quantization parameter, a stored quantization parameter and stored coefficients for a prior block to emulate AC prediction, by:
generating a current difference from the unified-stage output coefficients and the current quantization parameter;
generating a prior difference from the stored coefficients and the stored quantization parameter;
combining the current difference and the prior difference to generate a combined difference;
adjusting the combined difference with the current quantization parameter to generate the predicted coefficients;
and
selecting as selected coefficients the predicted coefficients for input to the inverse transformer for the first row or for the first column when the AC prediction flag is true,
whereby AC prediction is performed after inverse-quantization.

10. The computer-readable medium of claim 9 wherein the prior block is an immediately prior block to the current block when the first column is AC predicted;
wherein the prior block is prior block immediately above the current block when the first row is AC predicted.

11. The computer-readable medium of claim 9 wherein generating predicted coefficients comprises:
generating a current difference from the unified-stage output coefficients and the current quantization parameter;
generating a prior difference from the stored coefficients and the stored quantization parameter;
combining the current difference and the prior difference and multiplying by two to generate a combined difference; and
adjusting the combined difference with the current quantization parameter to generate the predicted coefficients.

12. The computer-readable medium of claim 11 wherein generating the current difference for each coefficient comprises:
rounding the current quantization parameter to an odd number to generate an odd current quantization parameter;
subtracting the odd current quantization parameter from a unified-stage coefficient that is one of the unified-stage output coefficients when the unified-stage coefficient is positive, and adding the unified-stage coefficient to the odd current quantization parameter when the unified-stage coefficient is negative;
wherein generating the prior difference for each coefficient comprises:
rounding the stored quantization parameter to an odd number to generate an odd prior quantization parameter;
subtracting the odd prior quantization parameter from a stored coefficient that is one of the stored coefficients when the stored coefficient is positive, and adding the stored coefficient to the odd prior quantization parameter when the stored coefficient is negative.

13. The computer-readable medium of claim 12 wherein generating the prior difference for each coefficient further comprises:
adjusting the prior difference by multiplying and integer-dividing by the current quantization parameter.

14. The computer-readable medium of claim 13 wherein adjusting the combined difference with the current quantization parameter to generate the predicted coefficients comprises:
rounding the current quantization parameter to an odd number to generate an odd current quantization parameter;
subtracting the odd current quantization parameter from a combined difference when the combined difference is negative, and adding the combined difference to the odd current quantization parameter when the combined difference is positive.

15. A computer-program product comprising:
a computer-readable memory medium storing computer-readable program code means embodied therein for decoding and AC-predicted video bit-stream, the computer-readable program code means in the computer-program product comprising:
parser means for parsing an encoded bit-stream for an AC prediction flag for a current block and for extracting a current portion of the bit-stream for the current block;
unified stage means for decoding the current portion of the bit-stream with a variable-length decoder to generate quantized discrete cosine transform (DCT) coefficients, and for inverse-quantizing the quantized DCT coefficients with a current quantization parameter for the current block to generate unified-stage output coefficients;
inverse transform means for generating pixels for the current block from selected coefficients by performing an inverse discrete cosine transform;
multiplex means, coupled to supply the selected coefficients to the inverse transform means, for selecting as the selected coefficients the unified-stage output coefficients when the AC prediction flag is false, and for selecting as selected coefficients predicted coefficients for a first row or for a first column when the AC prediction flag is true, storage means for storing the selected coefficients for the first row and for the first column as stored coefficients and for storing the current quantization parameter as a stored quantization parameter; and prediction means for generating the predicted coefficients for the first row or for the first column when the AC prediction flag is true by combining the unified-stage output coefficients, the current quantization parameter, a stored quantization parameter and stored coefficients for a prior block to emulate AC prediction;

wherein the prediction means further comprises:

current difference means for generating a current difference from the unified-stage output coefficients and the current quantization parameter;

prior difference means for generating a prior difference from the stored coefficients and the stored quantization parameter;

combining means for combining the current difference and the prior difference to generate a combined difference; and adjust means for adjusting the combined difference with the current quantization parameter to generate the predicted coefficients, whereby AC prediction is performed after inverse-quantization.

16. The computer-program product of claim 15 wherein the current difference means further comprises:

first round means for rounding the current quantization parameter to an odd number to generate an odd current quantization parameter;

first subtract means for subtracting the odd current quantization parameter from a unified-stage coefficient that is one of the unified-stage output coefficients when the unified-stage coefficient is positive, and adding the unified-stage coefficient to the odd current quantization parameter when the unified-stage coefficient is negative;

first divide means for dividing an output of the first subtract means by two;

wherein the prior difference means further comprises:

second round means for rounding the prior quantization parameter to an odd number to generate an odd prior quantization parameter;

second subtract means for subtracting the odd prior quantization parameter from a stored coefficient that is one of the stored coefficients when the stored coefficient is positive, and adding the stored coefficient to the odd prior quantization parameter when the stored coefficient is negative;

second divide means for dividing an output of the second subtract means by two.

* * * * *